Patented Apr. 5, 1932

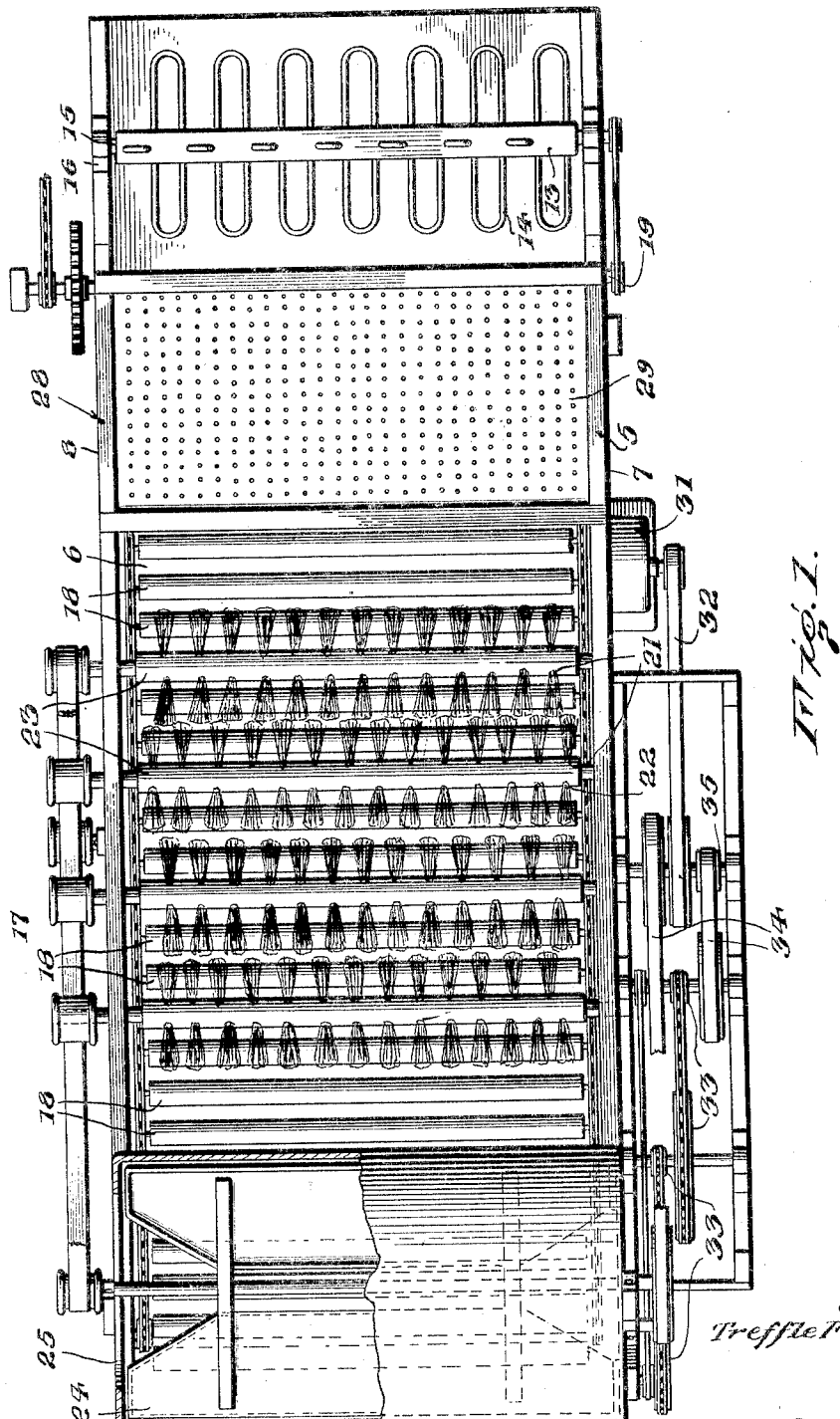

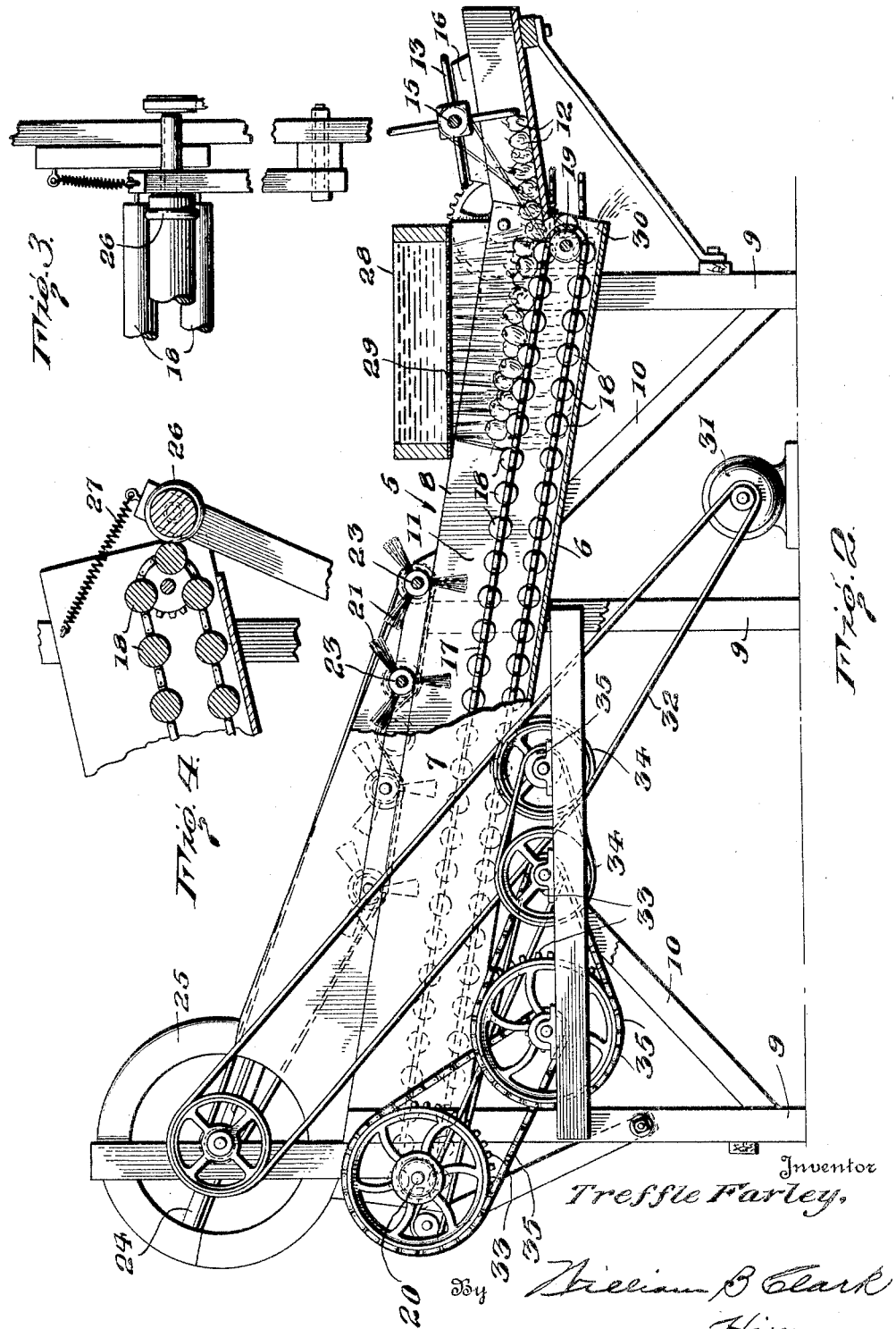

1,852,405

UNITED STATES PATENT OFFICE

TREFFLE FARLEY, OF YAKIMA, WASHINGTON, ASSIGNOR, BY DIRECT AND MESNE ASSIGNMENTS, OF ONE-HALF TO WILLIAM McGONAGLE, OF YAKIMA, WASHINGTON

FRUIT WASHER AND DRIER

Application filed May 20, 1929. Serial No. 364,651.

This invention relates to mechanisms for washing and drying fruit quickly and economically.

The principal object of the invention is an apparatus to wash and dry fruit, particularly apples, so as to prepare the same for marketing.

An important object is the construction of an efficient, inexpensive, durable apparatus which may be easily disassembled for the cleaning and replacement of parts and which is designed so that the fruit or apples will not be damaged or bruised.

Another important object of the invention is a novel form of washing apparatus to thoroughly cleanse the fruit.

With the foregoing and other objects in view the invention consists in the details of construction and combination of parts to be hereinafter described and set forth in the claim.

In describing the invention in detail reference will be had to the accompanying drawings wherein like characters of reference denote corresponding parts in the several views, and in which, Figure 1 is a top plan view, parts being shown in section.

Fig. 2 is a side elevation with a part being shown in section.

Fig. 3 is a detailed view of the tripping mechanism, and

Fig. 4 is a section thereof.

Numeral 5 indicates the entire wood frame assembly, having an inclined floor 6, the sides 7 and 8 all being suitably supported by legs 9 and braces 10. At one end is an inclined trough 11 to feed fruit (apples) 12 as clearly shown in Fig. 2. As a check to prevent fruit from bruising and to assist the feeding there is mounted above the inclined trough 11 a reel or agitator 13 having vanes 14 mounted in a shaft 15 which is journalled at 16.

Within the wood frame 5 is an endless belt 17 having a series of rollers 18. The belt 17 passes over transverse shafts 19 and 20 and on the belt is carried the fruit 12.

As the fruit is carried up it is cleaned by a plurality of brushes 21. The bottom 22 of each brush is firmly embedded in each shaft 23 but upon wearing of the brushes, others may be readily substituted.

After the fruit has been brushed, it is dried by a fan designated in its entirety by 24. Fan 24 has a suitable housing 25.

In order to dislodge fruit which has become wedged between the rollers 18 of the belt conveyor there has been provided a roller 26 rotatably supported by a frame pivotally mounted for movement towards and away from the discharge end of the trough. One or more springs 27 holds the frame in its normal position, and since the roller 26 is driven by a belt at one side of the frame 5 as shown in Figure 2, each roller 18 will have rotary motion imparted to it by contacting with the rollers 26 as shown in Figure 4. Therefore, fruit will be dislodged by the rapidly rotating roller 18 and discharged over the roller 26 into a suitable receptacle.

Referring now to Fig. 2, my novel form of washing and rinsing apparatus is shown. There is mounted above the receiving end of the wood frame 5 and across the same a tank 28 to hold fresh water though it is possible in the washing of some fruit to dilute an insecticide in the tank 28. The bottom 29 of the tank 28 is of metal and is perforated to any desired size to permit the water to flow by gravity so that it sprays the fruit which is passing below the perforations. No form of feeding water to the tank is shown although such pipes and tanks could be readily devised by those skilled in the art, but an outlet 30 for the draining of the rinse water is illustrated.

To drive the various shafts, brushes, belts, there may be installed a form of power (motor) 31 driving through belting 32, sprockets 33, pulleys 34, chains 35, etc. The exact arrangement of the driving mechanism forms no part of my invention.

In operation the apples are dumped into the receiving trough 11 and the speed with which they are fed and forced out controlled by the reel 13. The fruit is then taken by the belt and rollers under the spray from the water tank 28, then cleansed by the brushes 21 and dried by the fan 24 and prevented from congesting by means of the mechanism shown in Figs. 3 and 4. The several moving parts if worn may be replaced. The time of feeding may be adjusted; also the amount of flow from the tank together with the speed of the brushes and the fan.

It must be understood that only a preferred embodiment of my invention is herein shown and described and that any departure from the same, such as in size, shape or arrangement of parts may be resorted to without departing from the spirit of the invention or the scope of the subjoined claim.

What I claim is and desire to secure by Letters Patent in the United States is:

A fruit washer and drier comprising a trough, an endless conveyor moving through said trough and including rollers spaced from each other, a frame movably mounted at the discharge end of said trough, a roller carried by said frame, means to actuate said conveyor and rotate said roller, and means yieldably holding said frame in position for its roller to engage rollers of the conveyor and impart rotary motion thereto to dislodge fruit from between rollers of the conveyor.

TREFFLE FARLEY.